(12) United States Patent
Coron et al.

(10) Patent No.: US 7,471,791 B1
(45) Date of Patent: Dec. 30, 2008

(54) METHOD FOR COUNTERMEASURE IN AN ELECTRONIC COMPONENT USING A SECRET KEY ALGORITHM

(75) Inventors: Jean-Sebastien Coron, Paris (FR); Nathalie Feyt, Marseilles (FR); Olivier Benoit, Aubagne (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/913,884

(22) PCT Filed: Jan. 20, 2000

(86) PCT No.: PCT/FR00/00130

§ 371 (c)(1),
(2), (4) Date: Mar. 8, 2002

(87) PCT Pub. No.: WO00/49765

PCT Pub. Date: Aug. 24, 2000

(30) Foreign Application Priority Data

Feb. 17, 1999 (FR) .................................. 99 01937

(51) Int. Cl.
*H04L 9/06* (2006.01)
*H04K 1/02* (2006.01)
*H04L 9/28* (2006.01)

(52) U.S. Cl. ..................... 380/29; 380/259; 713/193

(58) Field of Classification Search ............... 380/29
See application file for complete search history.

(56) References Cited

U.S. PATENT DOCUMENTS

| | | | | |
|---|---|---|---|---|
| 5,168,521 A * | 12/1992 | Delaporte et al. | ............. | 380/29 |
| 5,214,701 A * | 5/1993 | Quisquater et al. | ............. | 380/29 |
| 5,550,809 A * | 8/1996 | Bottomley et al. | ........... | 370/342 |
| 5,625,690 A * | 4/1997 | Michel et al. | ................. | 705/53 |
| 5,870,470 A * | 2/1999 | Johnson et al. | ............. | 380/285 |
| 5,987,124 A * | 11/1999 | Matyas et al. | ................. | 380/37 |
| 6,278,783 B1 * | 8/2001 | Kocher et al. | ............... | 380/277 |
| 6,327,661 B1 * | 12/2001 | Kocher et al. | ............... | 713/193 |
| 6,615,354 B1 * | 9/2003 | Ohki et al. | .................. | 713/193 |

(Continued)

FOREIGN PATENT DOCUMENTS

FR       2672402 A       8/1992

OTHER PUBLICATIONS

Kocher et al. "Differential Power Analysis", 1999 Proceedings of the 19th Annual International Cryptology Conference on Advances in Cryptology, Springer-Verlag, pp. 388-397.*

(Continued)

*Primary Examiner*—Ayaz Sheikh
*Assistant Examiner*—Matthew T Henning
(74) *Attorney, Agent, or Firm*—Buchanan Ingersoll & Rooney PC

(57) ABSTRACT

A countermeasure method in an electronic component using a secret key algorithm K on an input message M executes an operation $O_{PN}(D)$ on input data D. A random value, of one first random information U, is generated that is of identical size as the input information D. A second random information V, is calculated by performing an exclusive OR operation between the input information and the first random information U. The operation $O_{PN}$ or the sequence of operations are successively executed on the first input information U and to the second random information V, supplying respectively a first random result $O_{PN}(U)$ and a second random result $O_{PN}(V)$.

14 Claims, 7 Drawing Sheets

U.S. PATENT DOCUMENTS 6,631,471 B1 * 10/2003 Ohki et al. .................. 713/193
6,940,975 B1 * 9/2005 Kawamura et al. ............ 380/37
7,073,072 B1 * 7/2006 Salle ......................... 713/193

OTHER PUBLICATIONS

Schneier et al. "Twofish: A 128-Bit Block Cipher" 1998, Counterpane Systems pp. 1-68.*
Chari et al. "Towards Sound Approaches to Counteract Power-Analysis Attacks", 1999 Proceedings of the 19th Annual International Cryptology Conference on Advances in Cryptology, Springer-Verlag, pp. 398-412.*
Messerges et al. "Investigations of Power Analysis Attacks on Smartcards", 1999, Usenix, pp. 1-12.*
Zhu et al. "The Analysis of a New Class of Unbalanced Cast Ciphers", 1997, IEEE pp. 1-4.*

Miyaguchi, S., *"Secret Key Ciphers That Change the Encipherment Algorithm Under the Control of the Key"*, NTT Review, vol. 6, No. 4, Jul. 1, 1994, pp. 85-90.
Y, X. et al, *"A Method for Obtaining Cryptographically Strong 8×8 S-Boxes"*, IEEE Global Telecommunications Conference, Phoenix, Arizona, Nov. 3-8, 1997, vol. 2, Nov. 3, 1997, pp. 689-693, Institute of Electrical and Electronics Engineers.
Miyaguchi, S., *"Secret Key Ciphers That Change the Encipherment Algorithm Under the Control of the Key"*, NTT Review, vol. 6, No. 4, Jul. 1, 1994, pp. 85-90.
Y, X. et al, *"A Method for Obtaining Cryptographically Strong 8×8 S-Boxes"*, IEEE Global Telecommunications Conference, Phoenix, Arizona, Nov. 3-8, 1997, vol. 2, Nov. 3, 1997, pp. 689-693, Institute of Electrical and Electronics Engineers.

* cited by examiner

METHOD FOR COUNTERMEASURE IN AN ELECTRONIC COMPONENT USING A SECRET KEY ALGORITHM

This disclosure is based upon, and claims priority from French Application No. 99/01937, filed on Feb. 17, 1999 and International Application No. PCT/FR00/00130, filed Jan. 20, 2000, which was published on Aug. 24, 2000 in a language other than English, the contents of which are incorporated herein by reference.

BACKGROUND OF THE INVENTION

The present invention concerns a countermeasure method in an electronic component using a secret key cryptography algorithm. They are used in applications where access to services or to data is strictly controlled. Such components have an architecture formed around a microprocessor and memories, including a program memory which contains the secret key.

These components are notably used in smart cards, for certain applications thereof. These are for example applications involving access to certain databanks, banking applications, remote payment applications, for example for television, petrol dispensing or passing through motorway tolls.

These components or cards therefore use a secret key cryptography algorithm, the best known of which is the DES algorithm (standing for Data Encryption Standard in British and American literature). Other secret key algorithms exist, such as the RC5 algorithm or the COMP128 algorithm. This list is of course not exhaustive.

In general terms and briefly, the function of these algorithms is to calculate an enciphered message from a message applied at the input (to the card) by a host system (a server, banking dispenser etc) and the secret key contained in the card, and supplying this enciphered message in return to the host system, which for example enables the host system to authenticate the component or the card, to exchange data etc.

The characteristics of the secret key cryptography algorithms are known: calculations made, parameters used. The only unknown is the secret key contained in program memory. All the security of these cryptography algorithms relates to this secret key contained in the card and unknown to the world outside this card. This secret key cannot be deduced solely from knowledge of the message applied as an input and the enciphered message supplied in return.

However, it has become apparent that external attacks, based on current consumptions or a differential current consumption analysis when the microprocessor of a card is running the cryptography algorithm in order to calculate an enciphered message, enable ill-intentioned third parties to find the secret key contained in this card. These attacks are referred to as DPA attacks, the English acronym for Differential Power Analysis.

The principle of these DPA attacks is based on the fact that the current consumption of the microprocessor executing the instructions varies according to the data being manipulated.

Notably, when an instruction executed by the microprocessor requires manipulation of data bit by bit, there are two different current profiles depending on whether this bit is "1" or "0". Typically, if the microprocessor manipulates a "0", there is at this time of execution a first consumed current amplitude, and if the microprocessor manipulates a "1" there is a second consumed current amplitude, different from the first.

Thus the DPA attack exploits the difference in current consumption profile in the card during the execution of an instruction according to the value of the bit manipulated. In simplified terms, conducting a DPA attack consists of identifying one or more particular periods during which the algorithm is run comprising the execution of at least one instruction manipulating data bit by bit; reading a very large number N of current consumption curves during this period or periods, one curve per different message to which the algorithm is applied; predicting, for each curve, the value taken by a bit of the data for an assumption on a subkey, that is to say on at least part of the secret key, which makes it possible to make the prediction; and making a sort of the curves according to the corresponding Boolean selection function: a first packet of curves is obtained for which the prediction is "1" and a second packet of curves for which the prediction is "0". By making a differential analysis of the mean current consumption between the two packets of curves obtained, an information signal DPA(t) is obtained. If the subkey assumption is not correct, each packet in reality comprises as many curves corresponding to the manipulation of a "1" as there are curves manipulating a "0". The two packets are therefore equivalent in terms of current consumption and the information signal is substantially zero. If the subkey assumption is correct, one packet actually comprises the curves corresponding to the manipulation of a "0" and the other packet actually comprises the curves corresponding to the manipulation of a "0": the information signal DPA(t) is not zero: it comprises consumption peaks corresponding to the manipulation by the microprocessor of the bit on which the sorting is based. These peaks have an amplitude corresponding to the difference in consumption by the microprocessor depending on whether it is manipulating a "1" or a "0". Thus, step by step, it is possible to discover all or part of the secret key contained in an electronic component.

There are many secret key algorithms for the execution of which the microprocessor must at certain times manipulate data bit by bit.

Notably, the algorithms generally comprise permutations which require such manipulations by the microprocessor. By analysing the current consumption during the execution of these manipulations bit by bit, it is possible to find the value of some bits at least of the data item manipulated. Knowledge of this data item can supply information on intermediate results obtained during the execution of the enciphering algorithm, which in their turn can make it possible to find at least some of the bits of the secret key used.

SUMMARY OF THE INVENTION

Three documents resembling the invention whilst being distinguished from it are cited below.

The first document "NTT Review, Vol. 6, No 4, of 1 Jul. 1997, pages 85-90, Miyaguchi S: "Secret key ciphers that change the encipherment algorithm under the control of the key", XP000460342", denoted D1, concerns a resolution of a mathematical problem which avoids the known enciphered attacks with a message. The method described modifies the "key schedule", translated by "subpart of the key in the algorithm", of any secret key algorithm. However, this method no longer applies to the standard DES algorithm, a well-known secret key algorithm. The technology described in this document consists of effecting data rotations and also data substitution.

The second document "Institute of Electrical and Electronics Engineers, IEEE Global Telecommunications Conference, Phoenix, Ariz., Nov. 3-8, 1997, vol. 2, 3 Nov. 1997, pages 689-693, Yi X et al: "A method for obtaining cryptographically strong 8×8 S-boxes", XP000737626", denoted D2, concerns a proposal to improve the S-boxes in the standard DES algorithm intended to improve security on a cryptanalysis level, that is to say in mathematics, but not in physical cryptography.

The third document "FR-A-2 672 402", denoted D3, concerns a method and device using the standard DES algorithm for constructing a random number generator. The DES algorithm is a secret key algorithm with data such as for example a counter intended to generate as an output a result which can be assimilated to a random number, a result situated outside the DES.

The object of the present invention is to protect the data on which manipulations are made bit by bit, by applying a countermeasure to them, that is to say a scrambling, so that the analysis of the current consumption during the manipulation of this data reveals no information on this data: the information signal DPA(t) will always be zero whatever the subkey or key assumptions made in the DPA attacks.

As claimed, the invention concerns a countermeasure method in an electronic component using a cryptographic algorithm with a secret key K.

According to the invention, the countermeasure method consists, for an operation or a series of operations applied to an input data item and comprising at least one manipulation bit by bit, of first drawing a first random data item of the same size as the first data item, calculating a second random data item by effecting an exclusive OR between the first random data item and the input data item, and successively applying the operation or series of operations to the first random data item and to the second random data item.

In this way, the operation or series of operations manipulates only random data items so that it is no longer possible to implement a DPA attack.

In order to find the output data item corresponding to the application of the series of steps to the input data item, it suffices to calculate the exclusive OR between the first and second random results.

In a first method of applying this countermeasure method, the operation or series of operations relate to a data item calculated from the message to be enciphered.

In a second method of applying the countermeasure method according to the invention, this method is applied to operations relating directly to the secret key and supplying, for each round of the algorithm, the subkey to be used.

In this method of applying the countermeasure method according to the invention, provision is made for effecting a first series of steps according to the method indicated above so that a first random subkey and a second random subkey are obtained.

In this variant, instead of calculating the true subkey for the round in question, these random subkeys are used, so that the true subkey of each round no longer appears in clear: only random subkeys are manipulated.

Thus the present invention is distinguished first of all from document D1 in that it concerns solely the DES without modifying its structure, nor its inputs, nor its data outputs. The XOR operation used described below makes it possible to mask the data with a random parameter.

It is also distinguished from document D2 in that it deals with the problems of physical cryptographies, that is to say it sets out to resolve problems of implementation through the appearance of secondary effects; in addition does not concern the S-boxes but deals with the problems of security during compressions, permutations and expansions of data (cf FIG. 1 described hereinafter).

Finally, it is distinguished from document D3 in that it uses a random number within the DES algorithm for protecting the execution of the DES against all types of attack.

BRIEF DESCRIPTION OF THE DRAWINGS

Other characteristics and advantages of the invention are detailed in the following description given for indication and in no way limitatively, and with reference to the accompanying drawings, in which.

DETAILED DESCRIPTION

Figure 1:
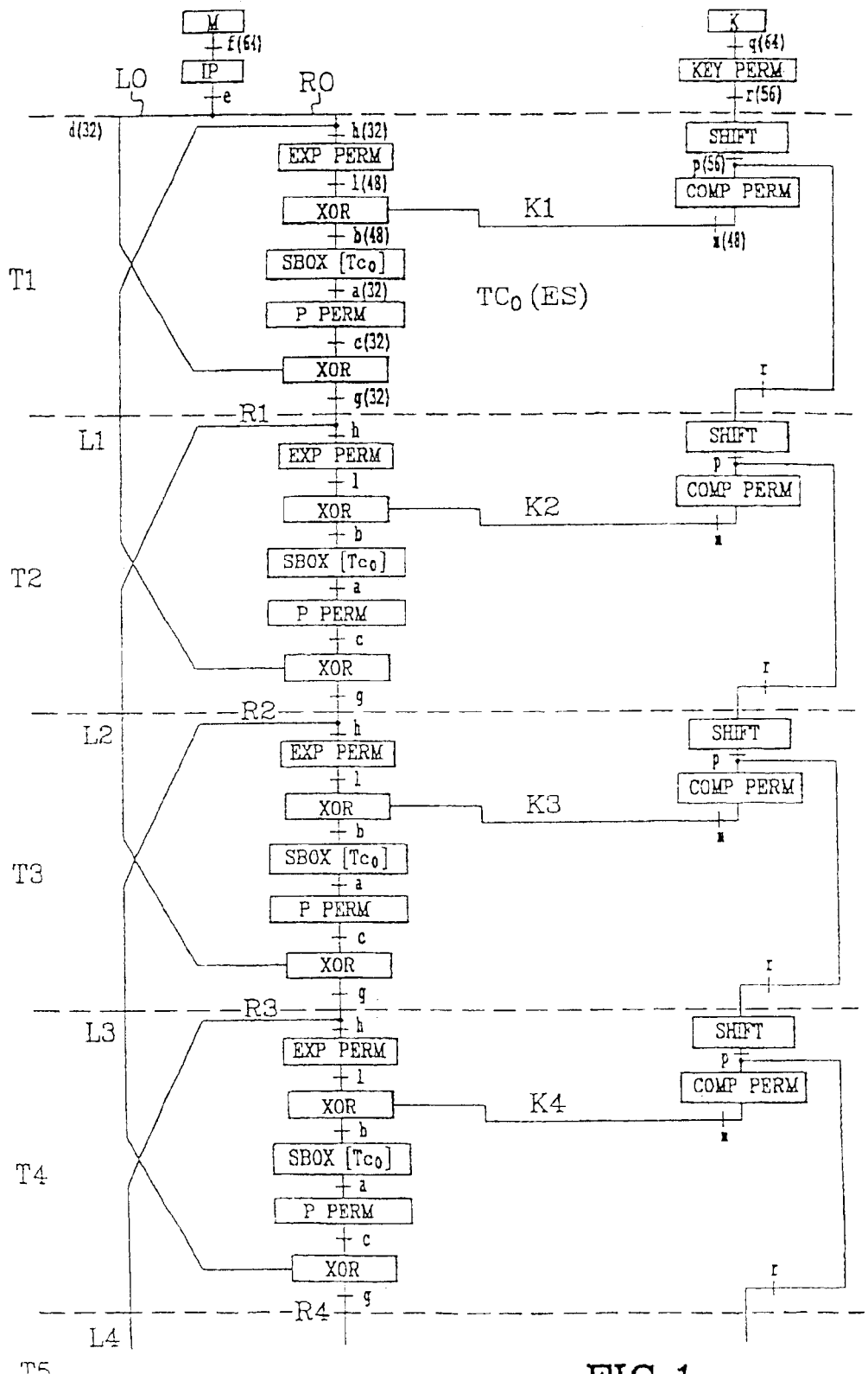
FIGS. 1 and 2 are detailed flow diagrams of the first and second rounds of the DES algorithm.
Figure 2:
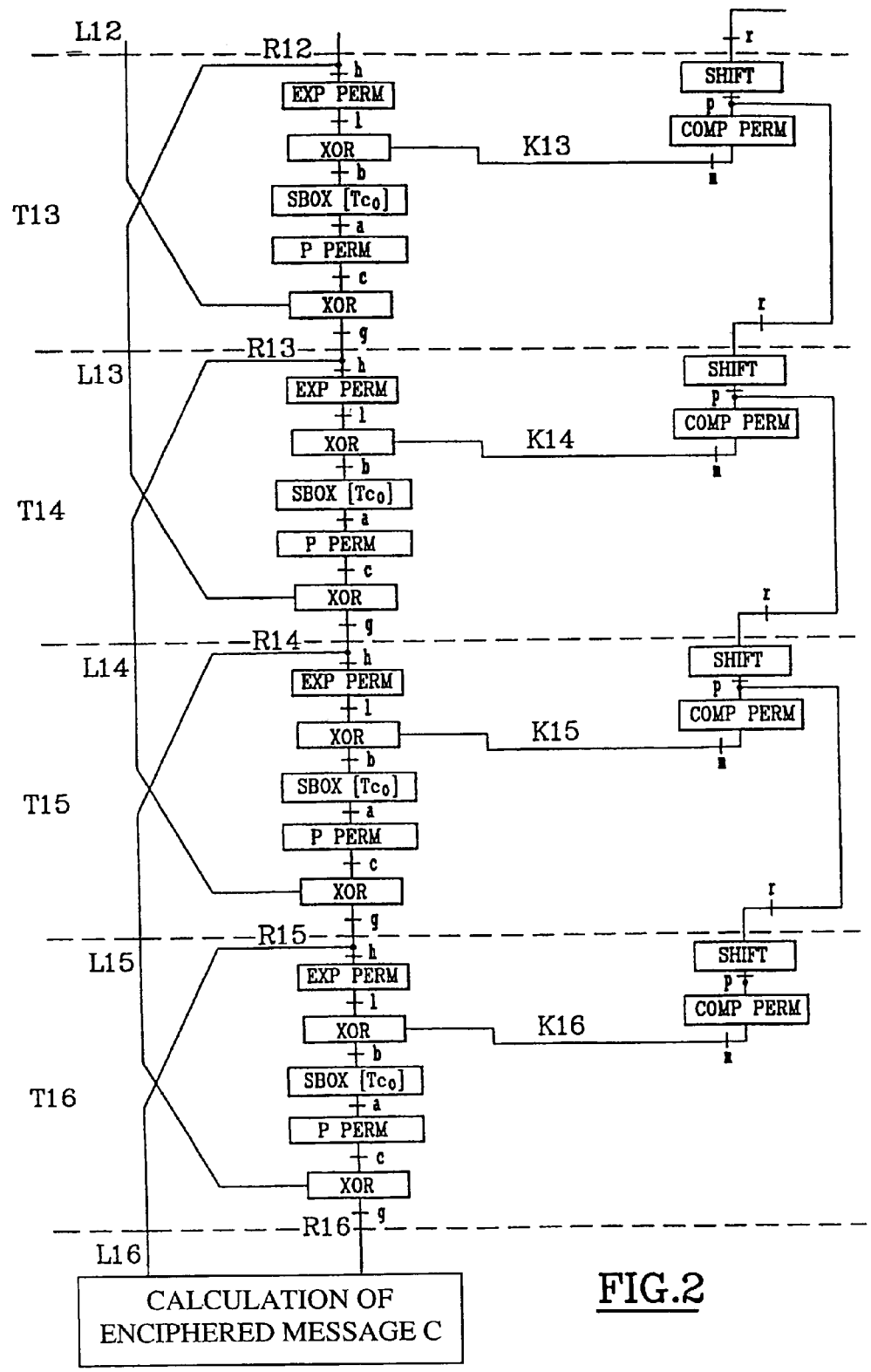

The DES secret key cryptographic algorithm (hereinafter reference will be made more simply to the DES or to the DES algorithm) includes 16 calculation rounds, denoted T1 to T16, as depicted in FIGS. 1 and 2.

The DES begins with an initial permutation IP on the input message M (FIG. 1). The input message M is a word f of 64 bits. After permutation, a word e of 64 bits is obtained, which is divided into two in order to form the input parameters L0 and R0 of the first round (T1). L0 is a word d of 32 bits containing the 32 most significant bits of the word e. R0 is a word h of 32 bits containing the 32 least significant bits of the word e.

The secret key K, which is a word q of 64 bits, itself undergoes a permutation and a compression in order to supply a word r of 56 bits.

The first round comprises an operation EXP PERM on the parameter R0, consisting of an expansion and a permutation, in order to supply as an output a word 1 of 48 bits.

This word 1 is combined with a parameter K1, in an operation of the exclusive OR type denoted XOR, in order to supply a word b of 48 bits. The parameter K1, which is a word m of 48 bits, is obtained from the word r by a shift by one position (the operation denoted SHIFT in FIGS. 1 and 2) supplying a word p of 48 bits, to which an operation is applied comprising a permutation and a compression (the operation denoted COMP PERM).

The word b is applied to an operation denoted SBOX, at the output of which a word a of 32 bits is obtained. This particular operation consists of supplying an output data a taken from a table of constants $TC_0$ according to an input data item b.

The word a undergoes a permutation P PERM, giving as an output the word c of 32 bits.

This word c is combined with the input parameter L0 of the first round T1, in a logic operation of the exclusive OR type, denoted XOR, which supplies as an output the word g of 32 bits.

The word h (=R0) of the first round supplies the input parameter L1 of the following round (T2) and the word g of the first round supplies the input parameter R1 of the following round. The word p of the first round supplies the input r of the following round.

The other rounds T2 to T16 occur in a similar fashion, except with regard to the shift operation SHIFT, which is effected on one or two positions according to the rounds in question.

Each round Ti thus receives as an input the parameters Li−1, Ri−1 and r and supplies as an output the parameters Li and Ri and r for the following round Ti+1.

At the end of the DES algorithm (FIG. 4), the enciphered message is calculated from the parameters L16 and R16 supplied by the last round T16.

This calculation of the enciphered message C comprises in practice the following operations:
  forming a word e' of 64 bits by reversing the positions of the words L16 and R16 and then concatenating them;
  applying the permutation $IP^{-1}$ which is the reverse of that of the start of DES, in order to obtain the word f' of 64 bits forming the enciphered message C.

It can be seen that this algorithm comprises many operations manipulating the data bit by bit, like the permutation operation.

According to the countermeasure method according to the invention, a software countermeasure is applied when the microprocessor which calculates the enciphered message effects a manipulation bit by bit. In this way, the statistical processing and the Boolean selection function of the DPA attack applied to the current consumption curves no longer supplies any information: the signal DPA(t) remains zero whatever the subkey assumptions made.

The software countermeasure according to the invention then consists of making each of the bits manipulated by the microprocessor unpredictable.

Figure 3:
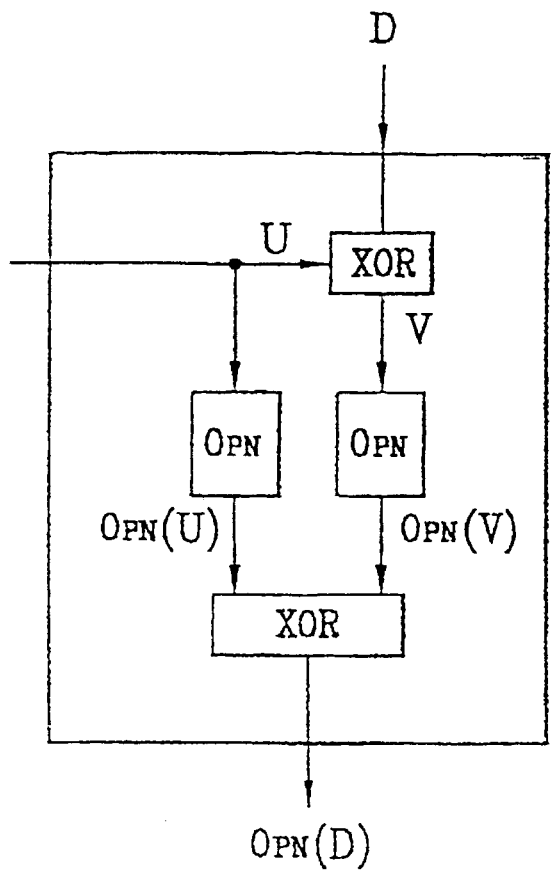
FIG. 3 depicts schematically the countermeasure method according to the invention applied to an operation effecting a data manipulation bit by bit.

The principle of this countermeasure is depicted in FIG. 3.

Let an input data item be D.

Let there be an operation OPN to be calculated on this input data item D, the result of which is denoted OPN(D). This operation OPN requires a bit by bit manipulation of the input data item D by the microprocessor; it is a case for example of a permutation.

According to the invention, instead of applying the operation OPN to the input data item D in order to calculate the result OPN(D) of the operation, the following different steps are performed:
  drawing a random value for a first random data item U, of the same size as the input data item D (for example 32 bits);
  calculating a second random data item V by effecting an exclusive OR between the input data item and the first random data item: V=D XOR U;
  calculating the operation OPN on the first random data item U, giving a first random result OPN(U);
  calculating the operation OPN on the second random data item V, giving a second random result OPN(V);
  calculating the result OPN(D) by effecting an exclusive OR between the first and second random results: OPN(D)=OPN(U) XOR OPN(V).

This method can equally well be applied to a single operation or to a series of operations.

A first method of applying the countermeasure method according to the invention concerns operations on data calculated from the message (M) to which the algorithm is applied. The input data item D is in this case a data item calculated from the message M.

Figure 4:
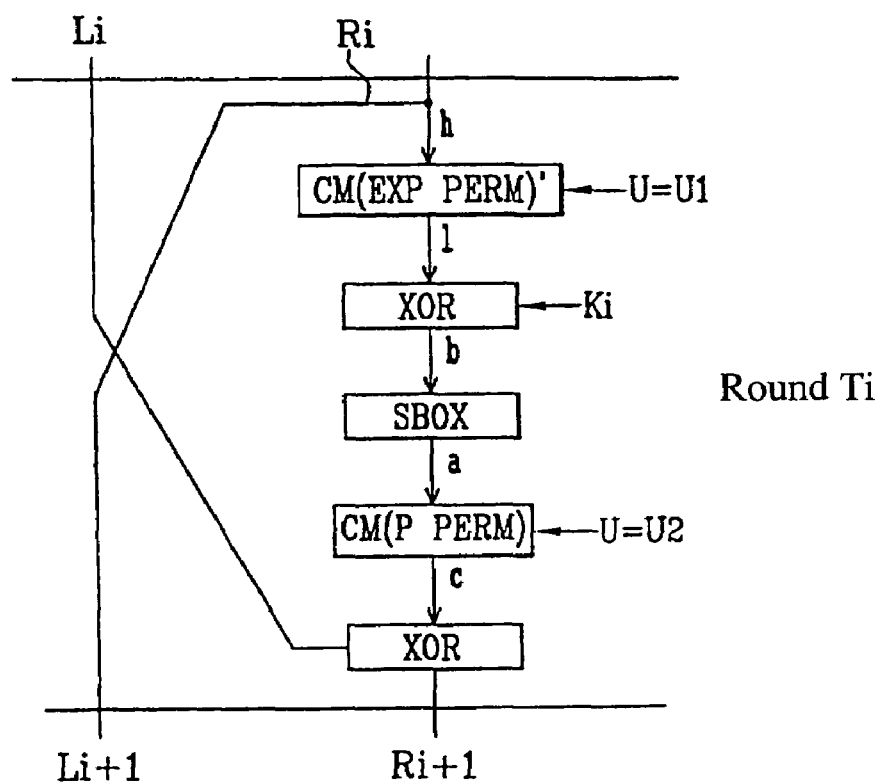
FIG. 4 depicts a first method of applying the countermeasure method according to the invention in the execution of the DES algorithm.

In a practical example of this first method of application of the algorithm DES depicted in FIG. 4, this method is applied on the one hand to the operation EXP PERM and on the other hand to the operation P PERM, which both comprise a permutation requiring a bit by bit manipulation of the input data item.

In the figure the application of this countermeasure to these operations is denoted CM(EXP PERM) and CM(P PERM).

The software countermeasure according to the invention then consists of performing, in place of each operation P PERM and EXP PERM, the operations CM(EXP PERM) and CM(P PERM) according to the calculation sequence described in FIG. 3, using a random variable U. As each round of the algorithm comprises an operation EXP PERM and an operation P PERM, this countermeasure can be applied in each of the rounds of the DES.

Experience shows that it is the first three rounds and the last three rounds which allow DPA attacks. Afterwards, it becomes very difficult or even impossible to predict the bits.

Thus an implementation of a countermeasure method according to the invention which is less expensive in calculation time consists of applying only these first three and last three rounds of the DES.

Different variant applications of the countermeasure method according to the invention concern the drawing of a random value for the first random data item U. Depending on whether or not a great deal of calculation time is available, it is possible to draw a new random value each time, for each of the operations or series of operations for which the countermeasure method according to the invention is implemented.

Thus, in FIG. 4, for the operation CM(EXP PERM), a value u1 for the random data item U is drawn and, for the operation CM(P PERM), another value u2 is drawn for the random value U.

Or else it is possible to draw a new random value for each round of the algorithm, or a single random value at the start of the algorithm.

The implementation of the countermeasure method according to the invention depends principally on the applications concerned, depending on whether or not it is possible to devote a great deal of additional time to the countermeasure.

Figure 6:
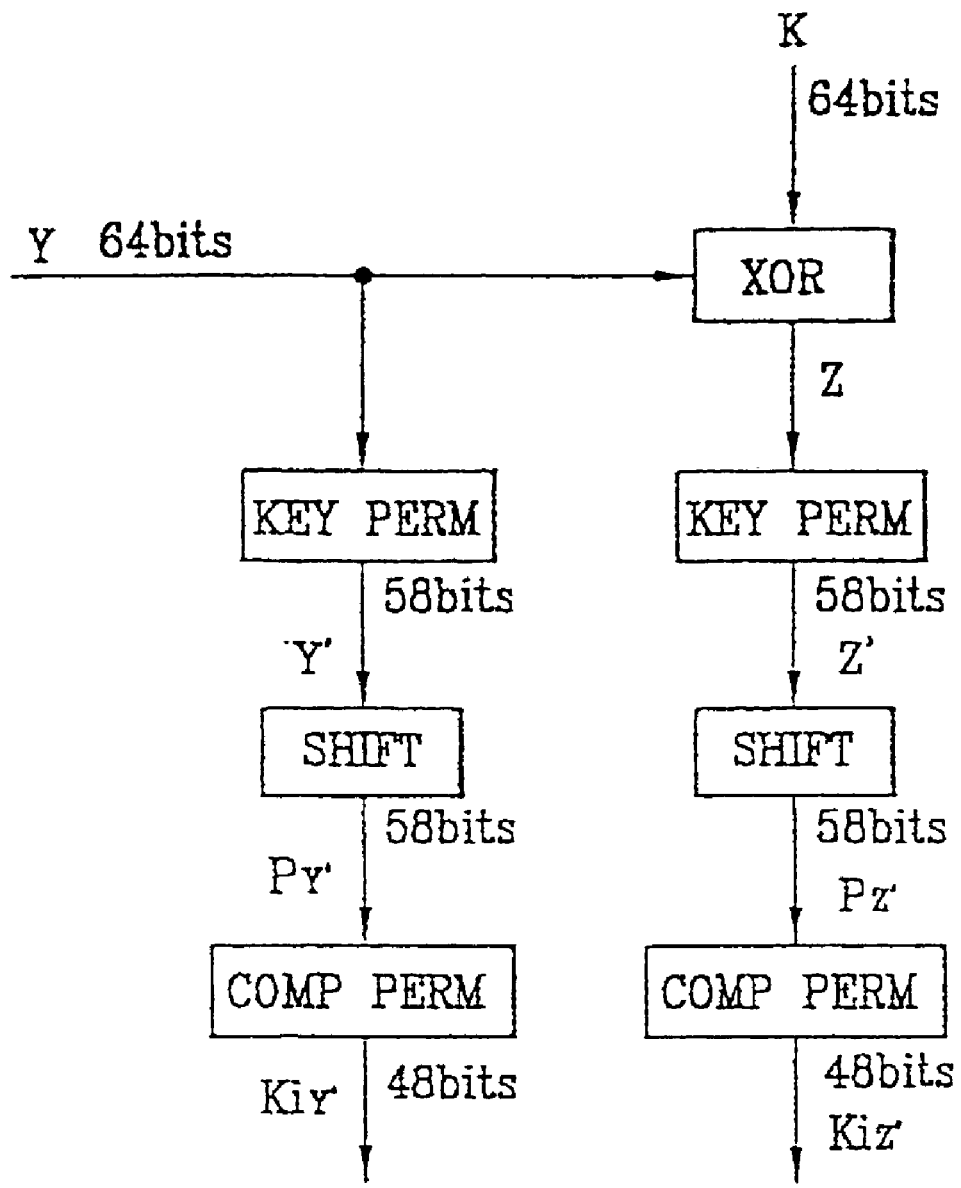
FIG. 6 depicts schematically a second method of applying the method according to the invention to the operations of the DES algorithm manipulating the secret key.

A second mode of applying the countermeasure method according to the invention is depicted in FIG. 6. It concerns more particularly the calculation operations applied to the secret key K in order to supply each of the subkeys Ki used in the rounds of the algorithm. In the example of the DES, these operations are the following KEY PERM, executed at the start of DES and SHIFT and COMP PERM executed at each round. During these operations, at certain times, the microprocessor separately manipulates a bit of the secret key, therefore leaving the possibility of a DPA attack on this bit.

The countermeasure method according to the invention is then applied by protecting the data item, the secret key in this case, before performing these operations, so that it is no longer possible to obtain information by DPA attack.

Figure 5:
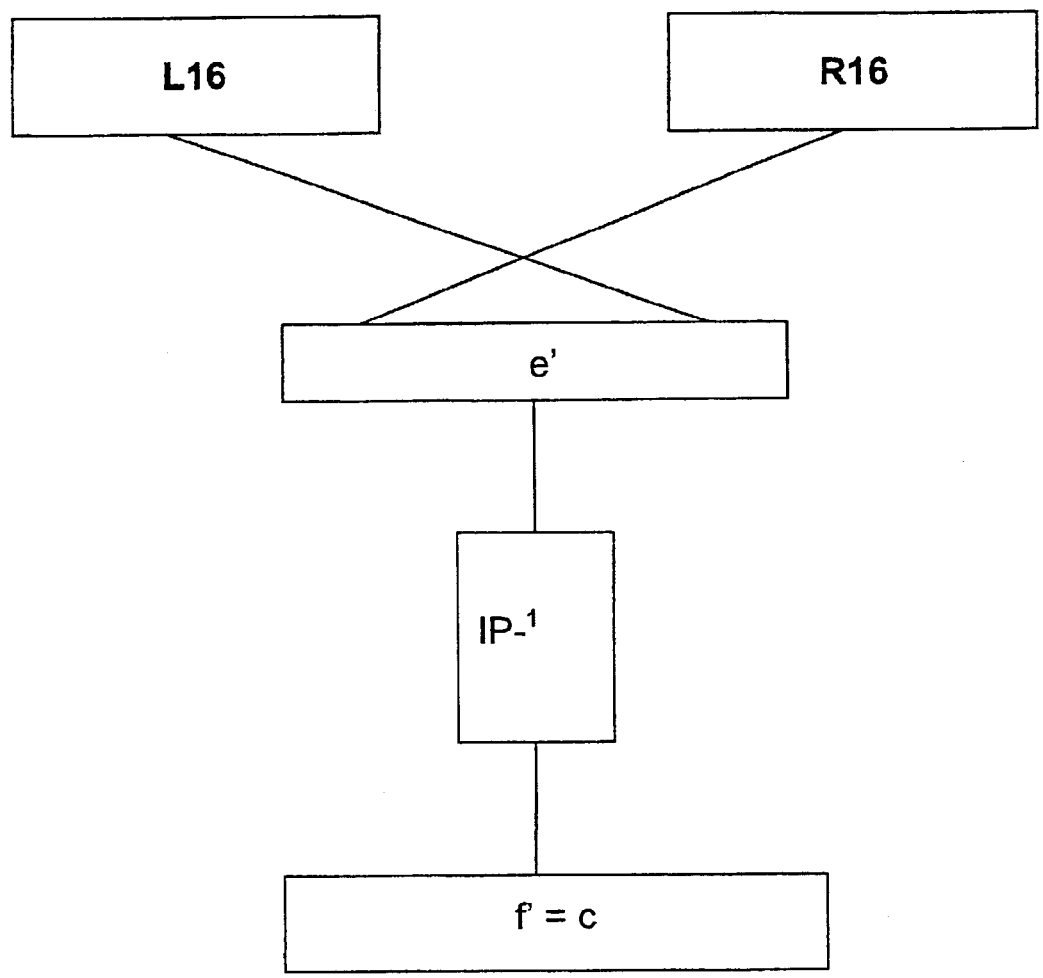
FIG. 5 depicts schematically the end of execution of the DES algorithm.

Thus, and as schematically shown in FIG. 5, a random value of a first random data item Y is drawn, with the same size as the secret key K. A second random data item Z with the same size is calculated, making an exclusive OR between the secret key K and the first random data item Y: Z=K XOR Y.

In the example, the sequence of operations comprises the following operations KEY PERM, SHIFT, COMP PERM. Then this sequence of operations is applied to each of the two random data items Y and Z, successively. Thus, from these two data items Y and Z applied successively as an input, the data items Y', $P_{iY'}$, $K_{iY'}$, or respectively Z', $P_{iZ'}$, $K_{iZ'}$ are obtained, at the output of the operations KEY PERM, SHIFT, COMP PERM.

Figure 7:
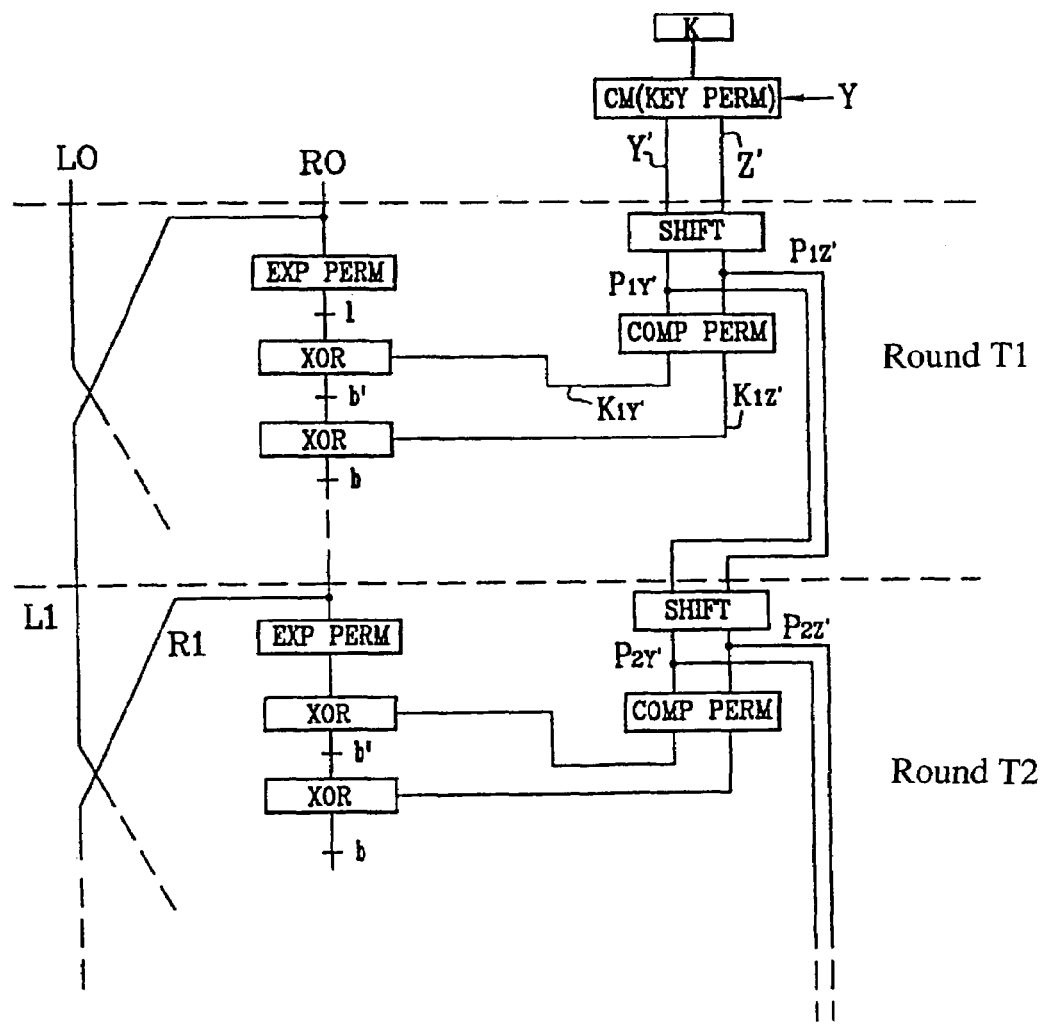
FIG. 7 depicts a detailed flow diagram of the DES algorithm in an application of the countermeasure method corresponding to the diagram in FIG. 5.

A practical example of an application to the DES is shown in FIG. 7.

In the DES, the operation KEY PERM is executed only once, at the start, whilst the sequence of operations SHIFT and COMP PERM is executed in each round.

In addition, the output of the operation SHIFT of a round Ti is applied as an input of the operation SHIFT of the following round Ti+1 (see FIGS. 1 and 2).

In order to apply the countermeasure method according to the second mode of application to this DES algorithm, the first operation KEY PERM is then applied to the random data Y and Z, which gives two intermediate random data, denoted Y' and Z'. These two intermediate random data are successively applied to the operations SHIFT of the first round T1, supplying two intermediate random data denoted $P_{1Y'}$ and $P_{1Z'}$. These two random data are on the one hand stored in working memory for the operation SHIFT of the following round (the second round), and on the other hand applied successively to the operation EXP PERM of the first round, in order to supply a first intermediate result $K_{1Y'}$ and $K_{1Z'}$.

This procedure is followed in each round. Thus, at each round Ti, a first random result is obtained: $K_{iY'}$=EXP PERM (SHIFT (Y')) and a second random result: $K_{iZ'}$=EXP PERM (SHIFT (Z'));

and the intermediate random data SHIFT (Y')=$P_{iY'}$ and SHIFT (Z')=$P_{iZ'}$ are stored in working memory for the following round Ti+1.

For each round Ti, it would then be possible to recalculate the corresponding subkey Ki corresponding to the sequence of operations KEY PERM, SHIFT and COMP PERM of this round applied to the secret key K, making an exclusive OR between the two random results $K_{iY'}$ and $K_{iZ'}$: Ki=$K_{iY'}$ XOR $K_{iZ'}$.

However, preferably and as depicted in FIG. 7, the subkey $K_i$ of the round Ti is not recalculated. The first random result $K_{iY'}$ is applied in place of the subkey Ki in an exclusive OR operation XOR with the data item 1 supplied by the permutation expansion operation EXP PERM. An intermediate result b' is obtained.

By then effecting an exclusive OR XOR of this intermediate result b' with the second random result $K_{iZ'}$, the output data item b=XOR (1, Ki) is found. The following operations are then performed in each round Ti, in order to calculate the parameter b from 1:

b'=1 XOR $K_{iY'}$ and b=b' XOR $K_{iZ'}$, as shown for the first and second rounds in FIG. 6.

In this way, the secret subkey itself is no longer used in calculating the enciphered message, but "random subkeys": the key is then protected before and during the execution of the cryptographic algorithm, since $K_{iY'}$ and $K_{iZ'}$ being random and not known to the external world of the component (or of the card), they are liable to change at each new execution of the cryptography algorithm. It should be noted that, in the application of the countermeasure method according to the invention to the calculation and use of the subkeys, a random value is drawn only once, at the start of execution of the algorithm, before the operations on the secret key.

This second mode of applying the countermeasure method according to the invention to the secret key can advantageously be combined with the first mode of applying the countermeasure method to the calculation of the enciphered message proper, this combination making the countermeasure particularly effective.

The present invention applies to the DES secret key cryptography algorithm, for which examples of implementation have been described. It applies more generally to any secret key cryptography algorithm where the execution by the microprocessor of certain operations requires a bit by bit manipulation of data.

Figure 8:
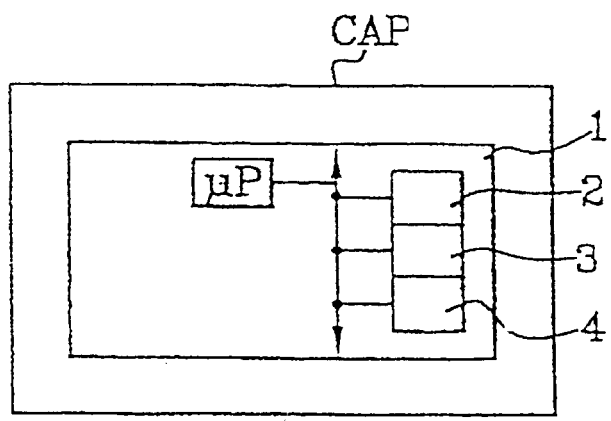
FIG. 8 depicts a block diagram of a smart card in which it is possible to implement the countermeasure method according to the invention.

An electronic component 1 using a countermeasure method according to the invention in a DES secret key cryptography algorithm comprises typically, as shown in FIG. 8, a microprocessor μP, a program memory 2 and a working memory 3. Means 4 of generating a random value are provided which, if reference is made to the flow diagrams in FIGS. 3 and 5, will supply the random values U and/or Y of the required size (32 bits for U, 64 bits for Y) at each execution of the cryptography algorithm. Such a component can particularly be used in a smart card 5, in order to improve its resistance to tampering.

The invention claimed is:

1. A countermeasure method in an electronic component that implements the DES cryptographic algorithm in which multiple rounds of calculation are performed on input data, said DES cryptographic algorithm being divided into stages including a plurality of successive rounds, wherein each round of calculation in the DES cryptographic algorithm includes at least the following operations:
a first permutation of data;
manipulation of the permuted data by a secret key;
a table look-up operation based on the manipulated data; and
a second permutation of data;

wherein, for some, but less than all, of said stages of said DES cryptographic algorithm, at least one of said first and second permutations of data comprises the following steps:
selecting a first random value having the same size as the data being permuted,
performing an exclusive-OR operation between the data being permuted and the first random value to generate a second random value,
executing said permutation operation on each of the first and second random values, to generate respective first and second random results, and
performing an exclusive-OR operation between said first and second random results to produce a final permuted result.

2. The method of claim 1, wherein said steps are performed for both of said first and second permutation operations in each of said plurality of successive rounds.

3. The method of claim 2, wherein the first and second permutation operations utilize different respective first random values.

4. The method of claim 1, wherein said some, but less than all, of said stages include:
a first stage consisting of the first three rounds of said DES cryptographic algorithm, and
a second stage consisting of the last three rounds of said DES cryptographic algorithm.

5. The method of claim 1, wherein the manipulation operation performed during said plurality of successive rounds comprises the following steps:

performing an exclusive-OR operation between said secret key and a third random value having the same size as said key, to generate a fourth random value;

performing bit-by-bit operations on each of said third and fourth random values to produce a pair of intermediate keys;

manipulating the result of said first permutation operation with one of said intermediate keys to produce an intermediate result, and manipulating said intermediate result with the other of said intermediate keys to produce an output data item.

6. The method of claim 5 wherein said manipulating steps comprise exclusive-OR operations.

7. The method of claim 5 wherein said bit-by-bit operations comprise a key permutation operation, a shift operation and a compression permutation operation.

8. An electronic component that implements the DES cryptographic algorithm in which multiple rounds of calculation are performed on input data, said DES cryptographic algorithm being divided into stages including a plurality of successive rounds, said electronic component including a microprocessor that executes the following operations during each round of calculation in the DES cryptographic algorithm:

a first permutation of data;

manipulation of the permuted data by a secret key;

a table look-up operation based on the manipulated data; and a second permutation of data;

wherein, for some, but less than all, of said stages of said DES cryptographic algorithm, said microprocessor executes the following steps for at least one of said first and second permutations of data:

selecting a first random value having the same size as the data being permuted, performing an exclusive-OR operation between the data being permuted and the first random value to generate a second random value, executing said permutation operation on each of the first and second random values, to generate respective first and second random results, and performing an exclusive-OR operation between said first and second random results to produce a final permuted result.

9. The electronic component of claim 8, wherein said steps are executed for both of said first and second permutation operations in each of said plurality of successive rounds.

10. The electronic component of claim 9, wherein said microprocessor selects different first random values for the first and second permutation operations, respectively.

11. The electronic component of claim 8, wherein said some, but less than all, of said stages include:

a first stage set of successive rounds consisting of the first three rounds of said DES cryptographic algorithm, and a second stage consisting of the last three rounds of said DES cryptographic algorithm.

12. The electronic component of claim 8, wherein the manipulation operation executed by said microprocessor during said plurality of successive rounds comprises the following steps:

performing an exclusive-OR operation between said secret key and a third random value having the same size as said key, to generate a fourth random value;

performing bit-by-bit operations on each of said third and fourth random values to produce a pair of intermediate keys;

manipulating the result of said first permutation operation with one of said intermediate keys to produce an intermediate result, and manipulating said intermediate result with the other of said intermediate keys to produce an output data item.

13. The electronic component of claim 12 wherein said manipulating steps comprise exclusive-OR operations.

14. The electronic component of claim 12 wherein said bit-by-bit operations comprise a key permutation operation, a shift operation and a compression permutation operation.

* * * * *